United States Patent
Blinn et al.

(10) Patent No.: US 8,504,021 B1
(45) Date of Patent: Aug. 6, 2013

(54) PERFORMANCE SCANNING AND CORRELATION IN WIRELESS COMMUNICATION DEVICES

(75) Inventors: Benjamin P. Blinn, Leawood, KS (US); Jason N. Ward, Lee's Summit, MO (US); Tuan Q. Tran, Olathe, KS (US); Louis Eric Wingo, Liberty, MO (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 124 days.

(21) Appl. No.: 13/177,726

(22) Filed: Jul. 7, 2011

(51) Int. Cl.
*H04W 36/00* (2009.01)
*H04W 4/00* (2009.01)

(52) U.S. Cl.
USPC .................. 455/432.1; 455/436; 370/331

(58) Field of Classification Search
USPC ...... 455/432.1, 436, 424, 552.1, 437; 370/331
See application file for complete search history.

(56) References Cited

U.S. PATENT DOCUMENTS

| | | | |
|---|---|---|---|
| 6,560,455 B2 | 5/2003 | Amin et al. | |
| 7,248,873 B2 | 7/2007 | Lehtinen et al. | |
| 2003/0224730 A1 | 12/2003 | Muszynski et al. | |
| 2004/0235474 A1* | 11/2004 | Ormson et al. | 455/435.2 |
| 2007/0047491 A1 | 3/2007 | Dutta et al. | |
| 2007/0091850 A1 | 4/2007 | Lee et al. | |
| 2008/0095114 A1 | 4/2008 | Dutta et al. | |
| 2008/0119182 A1 | 5/2008 | Kwun et al. | |
| 2010/0113032 A1* | 5/2010 | Lee et al. | 455/437 |
| 2011/0244856 A1* | 10/2011 | Jeyaseelan et al. | 455/432.1 |

* cited by examiner

*Primary Examiner* — Nizar Sivji

(57) ABSTRACT

A wireless communication device is disclosed for scanning a preferred roaming list (PRL) in a non-roaming mode. The wireless communication device exchanges wireless communications with a first wireless communication network and monitors communication performance of the first wireless communication network while operating in a non-roaming mode. The wireless communication device processes the PRL to perform scans for a pilot signal from a second wireless communication network while operating in the non-roaming mode. The wireless communication device subsequently performs a time correlation of the communication performance of the first wireless communication network and the scans for the pilot signal of the second wireless communication network to determine that a roaming mode should be entered. The roaming mode is then entered and the wireless communication device exchanges wireless communications with the second wireless communication network while operating in the roaming mode.

20 Claims, 8 Drawing Sheets

NON-ROAMING MODE
PERFORMANCE
GATHERING

| TIME | COMMUNICATION PERFORMANCE | PERFORMANCE PROBLEM TYPE |
|---|---|---|
| @T1 | EXCELLENT | N/A |
| @T2 | GOOD | N/A |
| @T3 | POOR | DROPPED CALL |
| @T4 | GOOD | N/A |
| @T5 | EXCELLENT | N/A |
| @T6 | EXCELLENT | N/A |
| @T7 | GOOD | N/A |
| @T8 | POOR | DROPPED CALL |
| @T9 | GOOD | N/A |
| @T10 | EXCELLENT | N/A |

FIGURE 4A

PILOT SIGNAL
SCANS

| TIME | PILOT | SIGNAL STRENGTH |
|---|---|---|
| @T1 | B | 0 |
| @T2 | B | 2 |
| @T3 | B | 7 |
| @T4 | B | 5 |
| @T5 | B | 4 |
| @T6 | B | 4 |
| @T7 | B | 5 |
| @T8 | B | 7 |
| @T9 | B | 2 |
| @T10 | B | 0 |

FIGURE 4B

PERFORMANCE SCANNING AND CORRELATION IN WIRELESS COMMUNICATION DEVICES

TECHNICAL BACKGROUND

Wireless communications have become increasingly prominent for sending and receiving information. For example, wireless customers may utilize a wireless communication device for voice communications, research, entertainment, or for conducting critical business transactions. However, use of these services requires access to a wireless network.

Roaming describes the extension of connectivity of service to a location that is outside the home network where a service is registered. Thus, roaming ensures that a wireless communication device is kept connected to a wireless network, without losing the connection, even when the wireless communication device moves outside the geographical coverage area of the home network.

A wireless communication device operates in a non-roaming mode or a roaming mode. The mode of operation is typically selected by a user of the wireless communication device. In the non-roaming mode, a wireless communication device must stay within the geographical coverage area of the home network to communicate. Thus, the wireless communication device does not scan for visitor network signals (i.e., those network locations that are outside the home network) in the non-roaming mode. Conversely, in the roaming mode, the wireless communication device scans for visitor network signals and roams on those networks to communicate when outside the geographical coverage area of the home network.

OVERVIEW

A wireless communication device is disclosed for scanning a preferred roaming list (PRL) in a non-roaming mode. The wireless communication device exchanges wireless communications with a first wireless communication network and monitors communication performance of the first wireless communication network while operating in a non-roaming mode. The wireless communication device processes the PRL to perform scans for a pilot signal from a second wireless communication network while operating in the non-roaming mode. The wireless communication device subsequently performs a time correlation of the communication performance of the first wireless communication network and the scans for the pilot signal of the second wireless communication network to determine that a roaming mode should be entered. The roaming mode is then entered and the wireless communication device exchanges wireless communications with the second wireless communication network while operating in the roaming mode.

BRIEF DESCRIPTION OF THE DRAWINGS

FIGS. 4A-4C illustrate operation of a wireless communication device in a wireless communication system.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
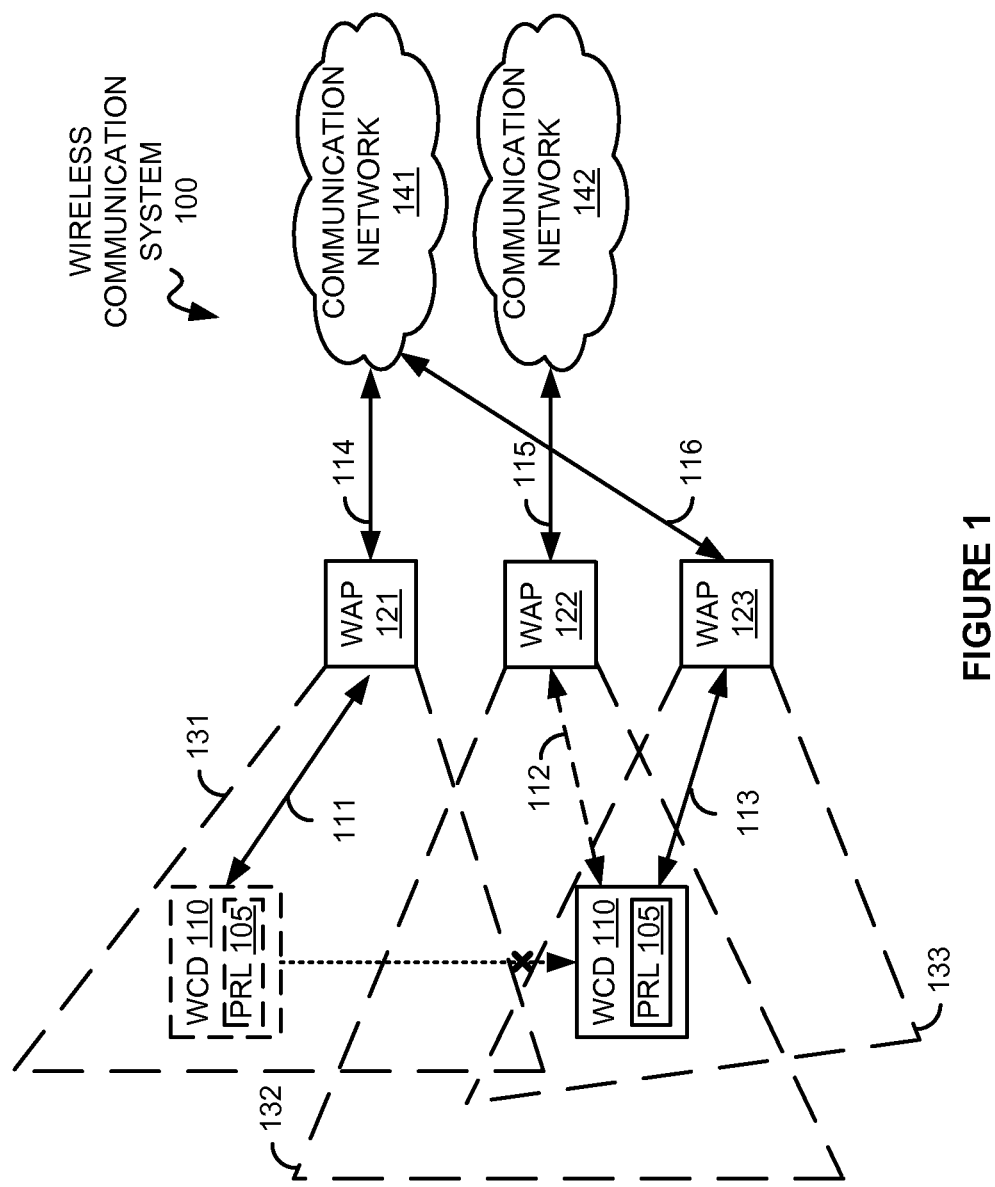
FIG. 1 illustrates a wireless communication system.

FIG. 1 illustrates a wireless communication system 100. Wireless communication system 100 comprises wireless communication device 110, preferred roaming list 115, wireless access point 121-123, geographical regions 131-133, communication networks 141-142, and communication links 111-115. More or fewer wireless communication devices, wireless access points, geographical regions, and communication networks may be included in communication system 100.

Geographical regions 131-133 correspond to respective wireless access points 121-123. Wireless communication device 110 and wireless access points 121-123 may communicate over respective communication lines 111-113 when wireless communication device 110 is within respective geographical regions 131-133. Wireless access points 121 and 123 and communication network 141 communicate over respective communication links 114 and 116. Wireless access point 122 and communication network 142 communicate over communication link 115.

The elements of wireless communication system 100 are divided into two distinct wireless networks (not shown). The first wireless network includes wireless access points 121 and 123, geographical regions 131 and 133, and communication network 141. The second wireless network includes wireless access point 122, geographical region 132, and communication network 142. Wireless communication device 110 may communicate with the second wireless network when operating in a roaming mode.

In operation, wireless communication device 110 exchanges communication with the first wireless network and monitors communication performance of the first wireless communication network while operating in a non-roaming scan mode. For instance, wireless communication device 110 initially exchanges wireless communication with wireless access point 121 and subsequently exchanges wireless communication with wireless access point 123 as wireless communication device 110 physically moves from geographic region 131, through geographic region 132, to graphical region 133.

In the non-roaming scan mode, wireless communication device 110 cannot roam in the second wireless communication network, and thus cannot communicate with the second wireless network. Nonetheless, in the non-roaming scan mode, wireless communication device 110 is configured to process preferred roaming list 105 and perform scans for a pilot signal from the second wireless communication network. The preferred roaming list may indicate which bands, sub bands, and/or service provider identifiers will be scanned and in what order. In this example, the preferred roaming list indicates the second wireless network.

Thus, as wireless communication device 110 physically moves from geographic region 131, through geographic region 132, to graphical region 133, wireless communication device 110 performs scans for a pilot signal transmitted by wireless access point 122. Wireless communication device 110 then time correlates the communication performance with the scans for the pilot signal to determine whether a roaming mode should be entered.

Figure 2:
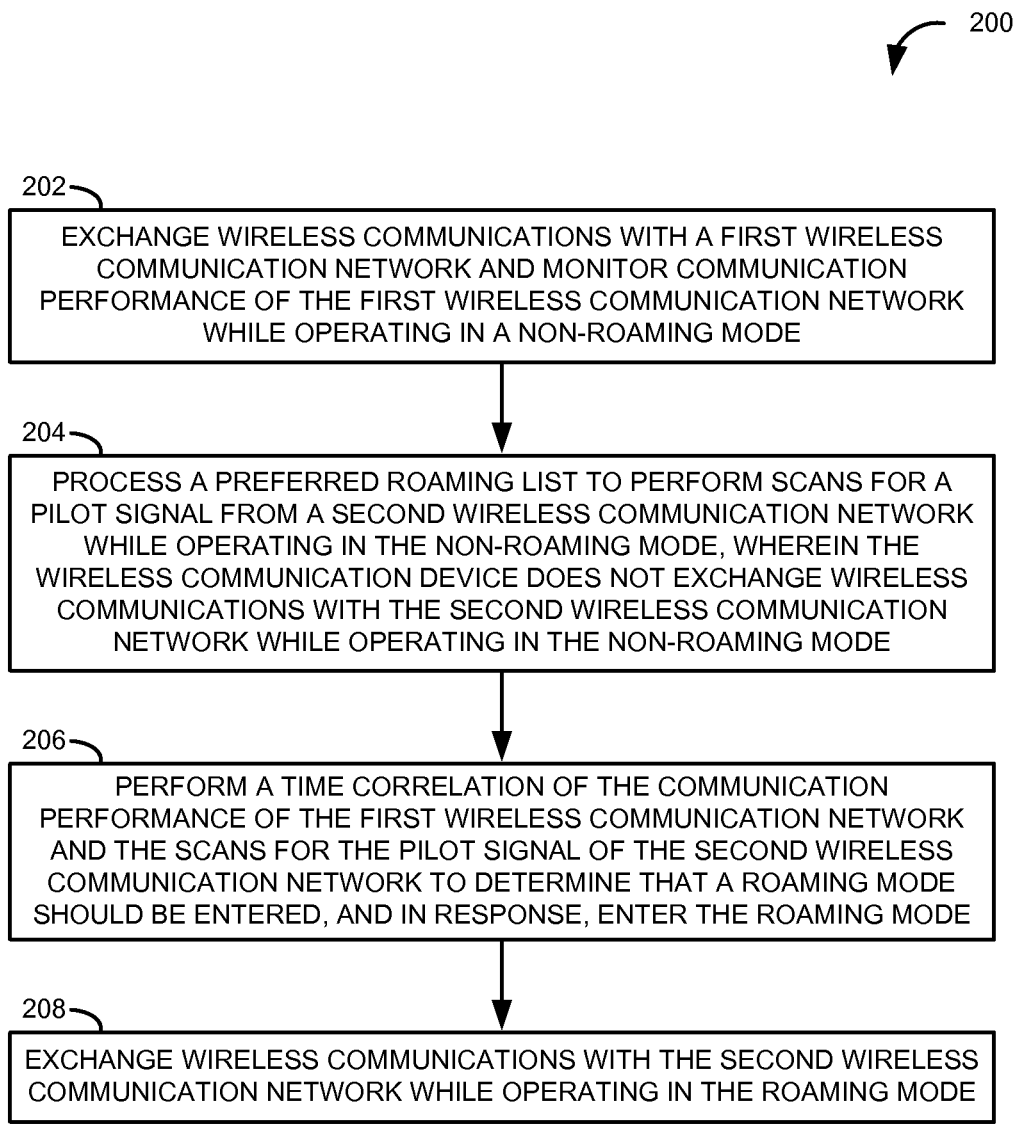
FIG. 2 illustrates operation of a wireless communication device in a wireless communication system.

FIG. 2 illustrates operation of wireless communication device 110 in wireless communication system 100. More specifically, FIG. 2 illustrates operation of wireless communication device 110 as the device physically moves from geographic region 131, through geographic region 132, to graphical region 133. In this example, wireless communication device 110 is initially operating in a non-roaming scan mode.

To begin, wireless communication device 110 exchanges wireless communications with a first wireless communication network and monitors communication performance of the first wireless communication network while operating in a non-roaming mode (202). For example, as wireless communication device 110 physically moves from geographic region 131, through geographic region 132, to graphical region 133, wireless communication device 110 monitors the communication performance of the first wireless network. Although not shown for simplicity in FIG. 1, the first wireless network includes wireless access points 121 and 123 and communication network 141. Thus, wireless communication device 110 may exchange voice and/or data communications with wireless access point 121 over wireless communication link 111 when the device is located within geographical region 131. Similarly, wireless communication device 110 may exchange voice and/or data communications with wireless access point 123 when the device is located within geographical region 133. Wireless access points 121 and/or 123 communicate over communication links 114 and 116 to communication network 141.

As discussed, wireless communication device 110 monitors communication performance of the first wireless communication network. Accordingly, when wireless communication device physically moves from geographic region 131 to graphical region 133, wireless communication device 110 briefly moves out of range of the first wireless network. Moving out of range of a wireless access point serving the first wireless access network negatively impacts performance. For instance, if wireless communication device 110 is engaged in an active voice call, the voice call may be dropped. Similarly, if wireless communication device 110 is not engaged in an active call, wireless communication device may still detect adverse performance conditions of the first wireless communication network such as, for example, a faded signal.

However, while operating in the non-roaming mode, wireless communication device 110 does not exchange wireless communications with the second wireless communication network. Wireless communication device 110 processes preferred roaming list 105 to perform scans for a pilot signal from a second wireless communication network while operating in the non-roaming mode (204). For example, wireless communication device 110 may perform scans for the pilot signal from the second wireless communication network. Wireless communication device 110 may perform scans periodically, continuously, and/or when wireless communication device 110 identifies poor performance on the first wireless communication network. It should be appreciated that other examples are also possible.

Wireless communication device 110 subsequently performs a time correlation of the communication performance of the first wireless communication network and the scans for the pilot signal of the second wireless communication network to determine that a roaming mode should be entered, and in response, enters the roaming mode (206). For example, wireless communication device 110 may determine of any number of instances in which wireless communication device 110 receives poor or deteriorated communication performance while operating in the first wireless communication network and compare this poor or deteriorated communication performance to the scans for the pilot signal for the second wireless communication system during the same time period. Thus, as wireless communication device 110 physically moves from geographic region 131 to graphical region 133, the device temporarily moves outside of the first wireless communication network, and thus wireless communication device 110 detects poor or deteriorated communication performance of the first wireless communication network during this time period.

Accordingly, wireless communication device 110 performs a time correlation of the performance of the first wireless communication network and the performance scans for the pilot signal from the second wireless communication network. The time correlation reveals that the performance scans for the pilot signal from the second wireless communication network were of an adequate quality during the time period in which poor or deteriorated communication performance of the first wireless communication network is detected. Thus, wireless communication device 110 determines that a roaming mode should be entered and enters the roaming mode.

Lastly, wireless communication device 110 exchanges wireless communications with the second wireless communication network while operating in the roaming mode (208). As discussed, once wireless communication device 110 enters the roaming mode, the device can communicate with the second wireless communication network. Thus, the next time that wireless communication device 110 experiences poor or deteriorated communication performance in the first wireless communication network, the device can process the PRL to identify the second wireless communication network and subsequently roam to the second wireless communication network in order to exchange wireless communications with the second wireless communication network.

Figure 3:
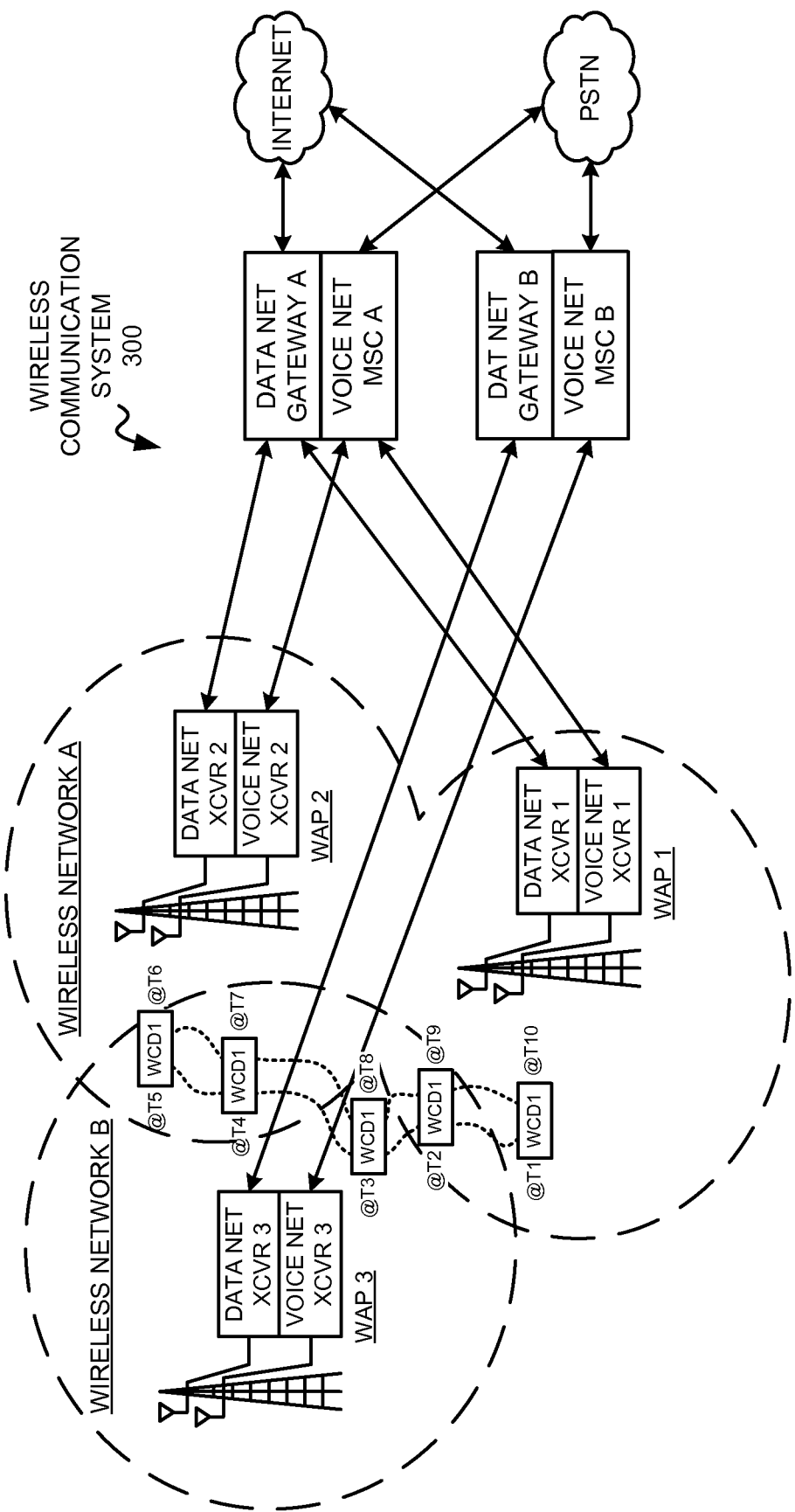
FIG. 3 illustrates a wireless communication system.

FIG. 3 illustrates a wireless communication system 300. Wireless communication system 300 comprises a first wireless network A and a second wireless network B. Wireless network A comprises wireless access point (WAP) 1 and WAP 2. Wireless network B comprises WAP 3. It is appreciated that each wireless network may be owned and operated by different wireless communication providers.

Wireless networks A and B each comprise both a wireless data network and a wireless voice network. Although the wireless data network and the wireless voice network share wireless access points, the wireless data network and the wireless voice network are typically discrete systems with separate transceivers and antennas at each access point. Thus, the data network and the voice network each have radio frequency circuitry mounted on the same physical structure. The wireless data network provides packet access to the Internet and to other data systems, such as email systems, media servers, and the like. The wireless voice network provides voice calling and text messaging. Although other network types could be used, the wireless voice network could be a Code Division Multiple Access (CDMA) 1× telephony network and the data network could be an Evolution Data-Only (EVDO) Internet access network.

In operation, wireless communication devices physically moves between geographical regions. As the wireless communication devices move between the geographical regions, the devices must be handed off from one WAP to the next. As disclosed herein, wireless communication providers may prefer to keep wireless communication devices within their own wireless network. However, under certain circumstances, a wireless communication provider may allow the wireless communication devices to be handed off to a wireless network operated by another wireless communication provider.

For example, FIG. 3 illustrates operation of wireless communication device WCD 1 as the device physically moves from a geographical region within range of WAP 1, through a geographical region within range of WAP 3, to a geographical region within range of WAP 2. In this example, wireless communication device WCD 1 then returns to its original location traversing the same or a similar path. Initially, wireless communication device WCD 1 exchanges wireless communications with wireless network A and monitors communication performance of wireless network A while operating in a non-roaming mode. In the non-roaming scan mode, wireless communication device WCD 1 cannot roam on wireless network B, and thus cannot exchange communications with wireless network B.

As wireless communication device WCD 1 physically moves between the geographic regions, the device monitors communication performance of wireless network A. The performance of wireless network may be measured in any number of ways. For example, wireless communication device WCD 1 may monitor one or more pilot signals. A pilot signals typically serves to define the boundaries of a cell or sector area served by a base station or access point. Thus, the further the wireless communication device is from the access point, the worse the performance of the wireless communication network. Alternatively or additionally, wireless communication device WCD 1 may monitor one or more other forward communication links including one or more data channels and/or one or more paging channels.

In this example, wireless communication device WCD 1 monitors the performance of wireless network A at times T1-T10, and at various times wireless communication device WCD 1 physically moves out of range of wireless access points WAP 1 and WAP 2 of wireless network A. Thus, at various times communication performance of wireless network A is negatively impacted. In some cases, the monitored performance may be associated with particular performance problem or event. For instance, if wireless communication device WCD 1 is engaged in an active voice call, the voice call may be dropped. Similarly, if wireless communication device WCD 1 is not engaged in an active call, wireless communication device may nonetheless detect adverse performance conditions of the wireless network A such as, for example, a faded signal.

Wireless communication device WCD 1 also processes a preferred roaming list (not shown) to perform scans for a pilot signal transmitted from wireless network B while operating in the non-roaming mode. However, wireless communication device WCD 1 does not exchange wireless communications with wireless network B while operating in the non-roaming mode. Scans for the pilot signal from the wireless network B may occur periodically, continuously, and/or based on specified events. For example, wireless communication device WCD 1 may perform scans for the pilot signal from wireless network B when wireless communication device WCD 1 identifies poor communication performance in wireless network A. It should be appreciated that other examples are also possible.

Wireless communication device WCD 1 subsequently performs a time correlation of the communication performance of the first wireless communication network and the scans for the pilot signal of the second wireless communication network to determine that a roaming mode should be entered, and in response, enters the roaming mode. For example, wireless communication device WCD 1 may keep of any number of instances in which the device receives poor or deteriorated communication performance while operating in the wireless network A and compare this poor or deteriorated communication performance to scans for the pilot signal for wireless network B during the same time period. Wireless communication device WCD 1 may then enter a roaming mode based on the outcome of this comparison.

Figure 4C:

FIGS. 4A-4C illustrate an example of operation of wireless communication device WCD 1 in wireless communication system 300 whereby the device enters a roaming mode. In particular, FIG. 4A illustrates non-roaming mode communication performance gathering, FIG. 4B illustrates pilot signal scans, and FIG. 4C illustrates a time correlation of the communication performance and the pilot signal scans.

Referring first to FIG. 4A, which illustrates performance gathering by wireless communication device WCD 1 in wireless communication system 300 according to the example. As discussed, wireless communication device WCD 1 monitors communication performance of wireless network A as the device physically moves between the geographic regions of communication system 300.

In this example, wireless communication device WCD 1 periodically monitors the performance of wireless network A. FIG. 4A comprises a first column labeled TIME and remaining columns from left to right labeled COMMUNICATION PEFORMANCE, and PERFORMANCE PROBLEM TYPE. Each row represents the monitored performance of wireless network A during the various time periods. The performance may be monitored in any number of ways. For example, the performance of wireless network A may be monitored periodically, continuously, and/or based on specified events. In this example, the communication performance of wireless network A is illustrated as: EXCELLENT, GOOD, or POOR. Other possible measures and/or depictions of the network communication performance are also possible.

As shown, at time T1 wireless communication device WCD 1 monitors the performance of wireless network A and determines that the communication performance of wireless network A is EXCELLENT. Wireless communication device WCD 1 further determines that there is no performance problem type associated with the communication performance at time T1. However, as wireless communication device WCD 1 moves away wireless point WAP 1, the device identifies decreased communication performance. In particular, at time T2 wireless communication device WCD 1 determines that the performance of wireless network A is GOOD. Consequently, the wireless communication device WCD 1 also determines that there is no performance problem type associated with the communication performance at time T2.

However, at time T3, wireless communication device WCD 1 temporarily moves out of range of wireless network A, and thus WCD 1 determines that the communication performance of wireless network A is POOR. Wireless communication device WCD 1 further determines that a dropped call occurred due the poor performance of wireless network A. Accordingly, a DROPPED CALL performance problem type is associated with the communication performance at T3. The associated dropped call may have occurred prior to or after the determination of poor wireless network performance.

At times T4 and T5, wireless communication device WCD 1 physically moves back into range of wireless network A, and thus WCD 1 determines that the communication performance of wireless network A is GOOD. Wireless communication device WCD 1 further determines that that there is no performance problem type associated with the communication performance at times T4 and T5.

At time T5, wireless communication device WCD 1 reaches its destination and returns to its original location traversing the same or a similar path. Accordingly, at time T8, wireless communication device WCD 1 determines that the communication performance of wireless network A is POOR. Wireless communication device WCD 1 further determines that another dropped call occurred due the poor performance of wireless network A. Accordingly, a DROPPED CALL performance problem type is associated with the communication performance at time T8.

In this example, wireless communication device WCD 1 experiences dropped calls at times T3 and T8. However, any number of performance problem types could occur as a result of the poor communication performance. For example, problem types may include dropped voice calls, faded signals, failed outgoing data attempts, and/or failed outgoing voice calls. Other problem types may include failed incoming data and/or failed incoming voice. The failed incoming messages may be detected by the wireless access points or the data network gateway or voice network mobile switching station (MSC) and passed on to the wireless communication device along with a timestamp.

Referring now to FIG. 4B, which illustrates pilot scans of wireless network B by wireless communication device WCD 1 in wireless communication system 300 according to the example. As discussed, wireless communication device WCD 1 processes a preferred roaming list (not shown) to perform scans for a pilot signal transmitted from wireless network B while operating in the non-roaming mode.

In this example, wireless communication device WCD 1 scans the pilot signal strength of wireless network B at time T1-T10. FIG. 4B comprises a first column labeled TIME and remaining columns from left to right labeled PILOT and SIGNAL STRENGTH. Each row represents the pilot signal that was monitored and the associated signal strength. Wireless communication device WCD 1 processes its preferred roaming list to identify one or more signals to scan. In this example, wireless communication device WCD 1 identifies a pilot signal from wireless network B to scan based on the preferred roaming list. Wireless communication device WCD 1 then scans for the pilot a given frequency in order to determine the signal strength of the pilot signal. In this example, the signal strength of the pilot signal is based on a value from 0-10 (0 being an undetectable pilot signal; and 10 being a maximum strength pilot signal).

Lastly, FIG. 4C illustrates the time correlation performed by wireless communication device WCD 1 in wireless communication system 300 according to the example. As discussed, wireless communication device WCD 1 performs a time correlation of the communication performance of wireless network A (shown in FIG. 4A) and the scans for the pilot signal of wireless network B (shown in FIG. 4B) to determine that a roaming mode should be entered, and in response, enters the roaming mode. In some cases, performing the time correlation comprises correlating the communication problems of wireless network A and the pilot signal strength of wireless network B to determine a quantity of communication performance problems that correlate in time to adequate pilot signal strengths in wireless network B. In this case, adequate pilot signal strength may be a signal strength that exceeds a specified signal strength threshold.

For example, FIG. 4C illustrates a correlation between the dropped calls at times T3 and T8 and the adequate signal strengths measured from the pilot signal of wireless network B during those times. In this example, the signal strength of "7" measured at times T3 and T8 exceed a signal strength threshold of, for example, "5." Accordingly, in this example, the quantity of communication performance problems that correlate in time to adequate pilot signal strength in wireless network B is two (i.e., instance at time T3 and instance at time T8).

Wireless communication device WCD 1 subsequently processes this information to determine whether a roaming mode should be entered. For example, in some cases, performing the time correlation to determine that the roaming mode should be entered comprises comparing the quantity of the communication performance problems that correlate in time to the adequate pilot signal strengths to a time-bound threshold. That is, if the quantity of communication performance problems that correlate in time to adequate pilot signal strength in wireless network B exceeds a threshold during a time-bound period, then the roaming mode will be entered. In this manner, the wireless communication device can predict when there is a likelihood of communication performance problems in wireless network A, and thus allow wireless communication device WCD 1 to roam on wireless network B when it will likely reduce the probability of a failure.

In other cases, a quantity of a type of performance problems is identified. Thus, performing the time correlation to determine that the roaming mode should be entered comprises correlating a type of communication performance problem of wireless network A and the signal strength of a pilot signal of wireless network B to determine a quantity of the type of communication performance problem that correlates in time to adequate pilot signal strengths on wireless network B. Certain types of problems may not be as serious as others. For instance, a dropped voice call or a failed voice call attempt may be more serious than a failed outgoing text message. Likewise a failed outgoing text message may be more serious than a failed outgoing data attempt (e.g., Internet access attempt). Any number of considerations or factors may be taken into account regarding the importance of certain types of messages when determining whether the roaming mode should be entered.

Figure 5:
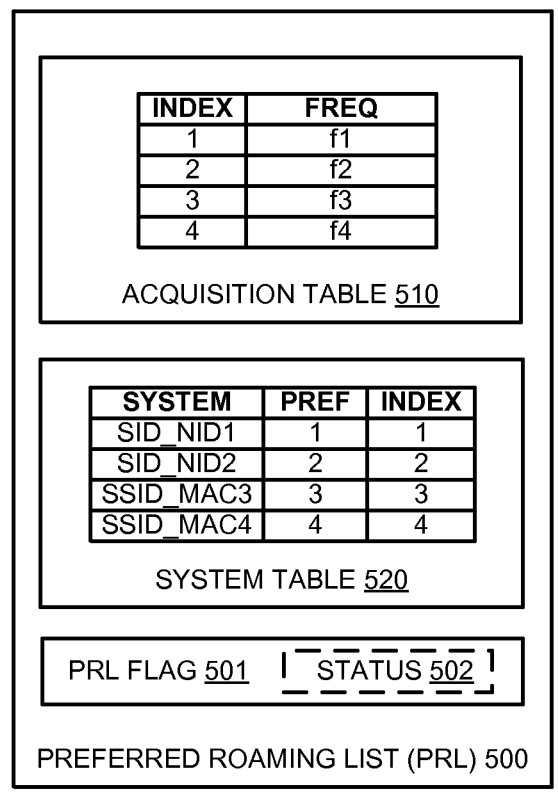
FIG. 5 illustrates a preferred roaming list.

FIG. 5 illustrates a preferred roaming list (PRL) 500. In this example, PRL 500 comprises acquisition table 510, system table 520, and PRL flag 501. However, it should be understood that PRL table 510 could take other forms and store other types of data.

Acquisition table 510 comprises an indexed list of frequencies on which the device may search for particular systems. As shown, acquisition table 510 comprises a first column labeled INDEX and a second column labeled FREQ. Accordingly, each row includes an index for the particular row and a radio frequency (RF) on which the wireless communication device may search for a communication system with which to connect. As shown, the first row comprises an index of "1" and an RF of "f1," which represents a first frequency on which the wireless communication device may search for a communication system with which to connect. The remaining rows include indices "2," "3," "4," and associated radio frequencies "f2," "f3," and "f4."

System table 520 comprises a list of preferred systems the wireless communication device is permitted to access. Although not shown, system table 520 may also include a list of forbidden systems that the wireless communication device is explicitly forbidden to access. As shown, system table 520 comprises a first column labeled SYSTEM followed by a second column labeled PREF, and a last column labeled INDEX. Accordingly, each row includes system identifying information in the SYSTEM column followed by a preference indicator in the PREF column and the associated index in the INDEX column.

In operation, a wireless communication device processes the preferred roaming list and performs scans for one or more identified pilot signals while operating in a non-roaming mode.

Figure 6:
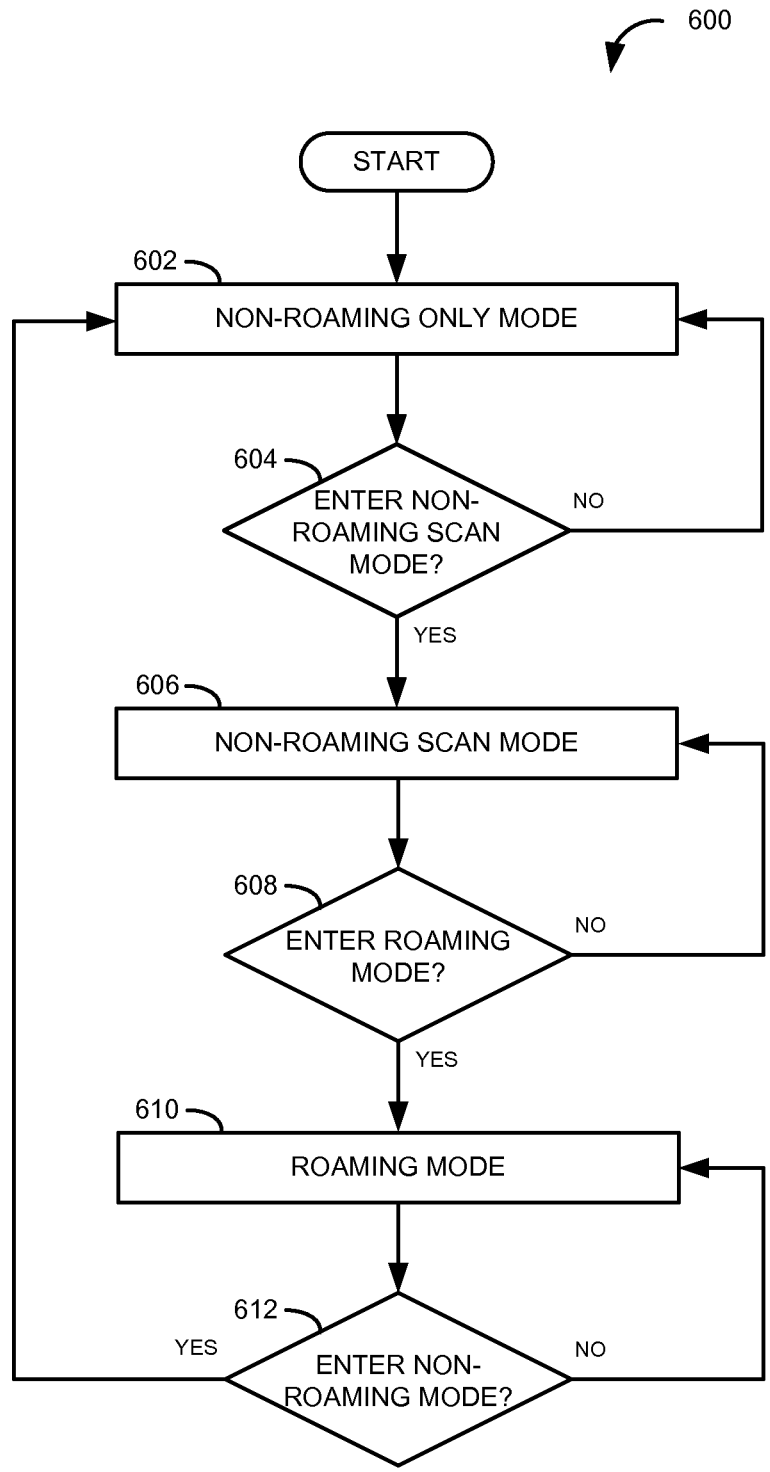
FIG. 6 illustrates operation of a wireless communication device in a wireless communication system.

FIG. 6 illustrates the various operational modes of a wireless communication device in a wireless communication system. To begin, the wireless communication device commences operation in a non-roaming only mode (602). In the non-roaming only mode, the wireless communication device does not roam on or scan other wireless networks. However, the wireless communication device may monitor communication performance of the first wireless communication network. The wireless communication device may then decide whether or not to enter a non-roaming scan mode (604). The wireless communication device may enter the non-roaming scan mode if, for example, a quantity of calls are dropped or if a quantity of faded signals during a specified period exceeds a threshold. The wireless communication device may make this determination based on the communication performance of the first wireless network or may receive this performance information from the network. Other examples are also possible.

If the criteria for entering the non-roaming scan mode are met, the non-roaming scan mode is entered (606). In the non-roaming scan mode, the wireless communication device does not roam on other wireless networks. However, the wireless communication device does process a preferred roaming list to perform scans for one or more pilot signals from other wireless communication networks while operating in the non-roaming mode scan mode. Moreover, while operating in the non-roaming scan mode, the wireless communication device continues to monitor the communication performance of the first wireless network.

The wireless communication device may then decide whether or not to enter a roaming mode (608). As discussed herein, the wireless communication device performs a time correlation of the communication performance of the first wireless network and the scans for the pilot signals from the other wireless communication networks to determine whether the roaming mode should be entered.

If the criteria for entering the roaming mode are met, the roaming mode is entered (610). In the roaming mode, the wireless communication device may roam on other wireless communication networks as provided in the preferred roaming list when needed. The wireless communication device may then decide whether to return to the non-roaming only mode (612). For example, the wireless communication device may return to the non-roaming only mode if a period of time elapses without the wireless communication device roaming on another wireless network. Although not show in FIG. 6, under certain circumstances the wireless communication device may return to a non-roaming scan mode from the roaming mode. Likewise, the wireless communication device may return to the non-roaming only mode from the non-roaming scan mode if, for example, a number of time correlations of the communication performance of the first wireless communication network and the scans for pilot signals do not reveal adequate pilot strengths on the other wireless communication networks.

Figure 7:
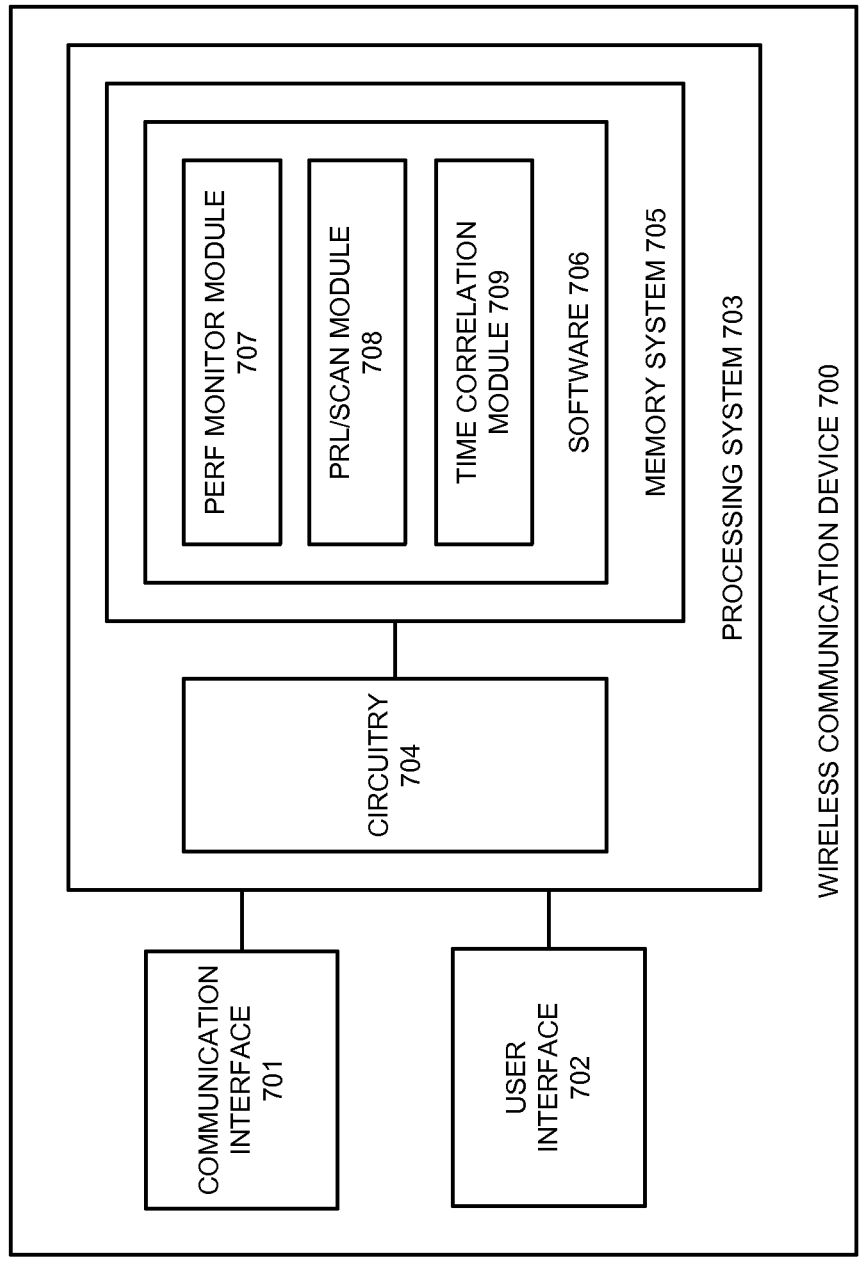
FIG. 7 illustrates a wireless communication device.

FIG. 7 illustrates a wireless communication device 700. Wireless communication device 700 provides an example of wireless communication device WCD 110 of FIG. 1 and wireless communication device WCD 1 of FIG. 3, although these systems may use alternative configurations. Wireless communication device 700 comprises communication interface 701 and a processing system 703. Processing system 703 is linked to communication interface 701. Processing system 703 includes processing circuitry 704 and memory system 705 that stores operating software 706. Operating software 706 comprises software modules 707-709.

Communication interface 701 comprises components that communicate over communication links, such as network cards, ports, RF transceivers, processing circuitry and software, or some other communication devices for communicating with wireless access points, such as with wireless access points 121-123 of FIG. 1. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 704 comprises microprocessor and other circuitry that retrieves and executes operating software 706 from memory system 705. Processing circuitry 704 may comprise single device or be distributed across multiple devices—including devices in different geographic areas. Processing circuitry 704 may be embedded in various types of equipment.

Memory system 705 comprises a non-transitory storage medium, such as a disk drive, flash drive, data storage circuitry, or some other memory apparatus. Memory system 705 may comprise single device or be distributed across multiple devices—including devices in different geographic areas. Memory system 705 may be embedded in various types of equipment.

Operating software 706 comprises computer programs, firmware, or some other form of machine-readable processing instructions. Operating software 706 may include an operating system, utilities, drivers, network interfaces, applications, or some other type of software. In this example, operating software 706 also comprises software modules 707-709, although software 706 could have alternative configurations. When executed by processing circuitry 704, operating software 706 directs processing system 703 to operate as described herein.

In particular, when executed by a wireless communication device, performance monitor module 707 directs the wireless communication device to monitor communication performance of a first wireless communication network while operating in a non-roaming mode, PRL/SCAN module 708 directs the wireless communication device to process a preferred roaming list to perform scans for a pilot signal from a second wireless communication network while operating in the non-roaming mode, and time correlation module 709 directs the wireless communication device to perform a time correlation of the communication performance of the first wireless communication network and the scans for the pilot signal of the second wireless communication network to determine that a roaming mode should be entered.

Referring back to FIG. 1, wireless communication device 110 could be a communication device such as a telephone, transceiver, mobile phone, cellular phone, smartphone, computer, personal digital assistant (PDA), e-book, game console, mobile Internet device, wireless network interface card, media player, VoIP system, or some other communication apparatus—including combinations thereof. Wireless communication device 110 comprises Radio Frequency (RF) communication circuitry and an antenna. The RF communication circuitry typically includes an amplifier, filter, modulator, and signal processing circuitry. Wireless communication device 110 may also include a user interface, memory device, software, processing circuitry, or some other communication components.

Wireless access points 121-123 comprise access systems, network elements and communication links. Wireless access points 121-123 may include wireless base stations, network access points, gateways, routers, switches, call processors, servers, communication links, and the like. Wireless access points 121-123 comprises a computer and communication systems that include processing circuitry, memory, software, and network communication interfaces. Wireless access points 121-123 may also include gateways, routers, servers, call processors, communication links, and other communication network elements.

Wireless network protocols that may be utilized by wireless communication device 110 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between communication device 110 and wireless data network 120.

Wireless communication links 111-113 use the air or space as the transport media. Communication links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Communication links 114-116 may use metal, glass, air, space, or some other material as the transport media. Communication links 114-116 may use various communication protocols, such as TDM, IP, Ethernet, wireless, or some other communication format—including combinations thereof. Communication links 114-116 may be one or more direct communication links or may comprise a combination of links, networks, systems, and devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
   in the wireless communication device, exchanging wireless communications with a first wireless communication network and monitoring communication performance of the first wireless communication network while operating in a non-roaming mode to determine communication performance problems of the first wireless communication network;
   in the wireless communication device, processing a preferred roaming list to perform scans for at least a pilot signal from a second wireless communication network while operating in the non-roaming mode to determine pilot signal strength of the second wireless communication network, wherein the wireless communication device does not exchange wireless communications with the second wireless communication network while operating in the non-roaming mode;
   in the wireless communication device, performing a time correlation of the communication performance problems of the first wireless communication network and the pilot signal strength of the second wireless communication network to identify a quantity of the communication performance problems that correlate in time to adequate pilot signal strength on the second wireless communication network to determine that a roaming mode should be entered, and in response, entering the roaming mode;
   in the wireless communication device, exchanging wireless communications with the second wireless communication network while operating in the roaming mode.

2. The method of claim 1, wherein the adequate pilot signal strengths exceed a signal strength threshold.

3. The method of claim 2 wherein performing the time correlation to determine that the roaming mode should be entered comprises comparing the quantity of the communication performance problems that correlate in time to the adequate pilot signal strengths to a time-bound threshold.

4. The method of claim 2 wherein performing the time correlation to determine that the roaming mode should be entered comprises correlating a type of communication performance problem of the first wireless communication network and a signal strength of the pilot signal of the second wireless communication network to determine a quantity of the type of communication performance problem that correlates in time to the adequate pilot signal strengths on the second wireless communication network.

5. The method of claim 4 wherein the type of communication performance problem comprises a failed data message transmission.

6. The method of claim 4 wherein the type of communication performance problem comprises a failed voice call attempt.

7. The method of claim 1 wherein the non-roaming mode comprises a non-roaming only mode and a non-roaming scan mode, and wherein the wireless communication device does not roam or perform scans while operating in the non-roaming only mode and the wireless communication device does not roam but performs scans while operating the non-roaming scan mode.

8. The method of claim 7 wherein monitoring communication performance of the first wireless communication network while operating in the non-roaming mode comprises determining a quantity of dropped incoming voice calls, and in response to the quantity of dropped incoming voice calls exceeding a threshold during a time period, entering the non-roaming scan mode.

9. The method of claim 7 wherein monitoring communication performance of the first wireless communication network while operating in the non-roaming mode comprises determining a quantity of faded communication signals, and in response to the quantity of faded communication signal exceeding a threshold during a time period, entering the non-roaming scan mode.

10. A wireless communication device comprising: a communication transceiver configured to exchange wireless communications with a first wireless communication network while operating in a non-roaming mode and exchange wireless communications with a second wireless communication network while operating in a roaming mode, wherein the wireless communication device does not exchange wireless communications with the second wireless communication network while operating in the non-roaming mode; and a processing system configured to monitor communication performance of the first wireless communication network to determine communication performance problems of the first wireless communication network, process a preferred roaming list to perform scans for at least a pilot signal from the second wireless communication network while operating in the non-roaming mode to determine pilot signal strength of the second wireless communication network, and perform a time correlation of the communication performance problems of the first wireless communication network and the pilot signal strength of the second wireless communication network to identify a quantity of the communication performance problems that correlate in time to adequate pilot signal strength on the second wireless communication network to determine that a roaming mode should be entered, and in response, to enter the roaming mode.

11. The wireless communication device of claim 10 wherein the adequate pilot signal strengths exceed a signal strength threshold.

12. The wireless communication device of claim 11 wherein to perform the time correlation to determine that the roaming mode should be entered, the processing system is configured to compare the quantity of the communication performance problems that correlate in time to the adequate pilot signal strengths to a time-bound threshold.

13. The wireless communication device of claim 11 wherein to perform the time correlation to determine that the roaming mode should be entered, the processing system is configured to correlate a type of communication performance problem of the first wireless communication network and a signal strength of the pilot signal of the second wireless communication network to determine a quantity of the type of communication performance problem that correlates in time to the adequate pilot signal strengths on the second wireless communication network.

14. The wireless communication device of claim 13 wherein the type of communication performance problem comprises a failed data message transmission.

15. The wireless communication device of claim 13 wherein the type of communication performance problem comprises a failed voice call attempt.

16. The wireless communication device of claim 10 wherein the non-roaming mode comprises a non-roaming only mode and a non-roaming scan mode, and wherein the wireless communication device does not roam or perform scans while operating in the non-roaming only mode and the wireless communication device does not roam but performs scans while operating the non-roaming scan mode.

17. The wireless communication device of claim 16 wherein to monitor communication performance of the first wireless communication network while operating in the non-roaming mode, the processing system is further configured to determine a quantity of dropped incoming voice calls, and in response to the quantity of dropped incoming voice calls exceeding a threshold during a time period, entering the non-roaming scan mode.

18. The wireless communication device of claim 16 wherein to monitor communication performance of the first wireless communication network while operating in the non-roaming mode, the processing system is further configured to determine a quantity of faded communication signals, and in response to the quantity of faded communication signal exceeding a threshold during a time period, entering the non-roaming scan mode.

19. A wireless communication system comprising:

a wireless communication device configured to exchange wireless communications with a first wireless communication network and monitoring communication performance of the first wireless communication network while operating in a non-roaming mode to determine communication performance problems of the first wireless communication network, process a preferred roaming list to perform scans for at least a pilot signal from a second wireless communication network while operating in the non-roaming mode to determine pilot signal strength of the second wireless communication network, wherein the wireless communication device does not exchange wireless communications with the second wireless communication network while operating in the non-roaming mode, perform a time correlation of the communication performance problems of the first wireless communication network and the pilot signal strength of the second wireless communication network to identify a quantity of the communication performance problems that correlate in time to adequate pilot signal strength on the second wireless communication network to determine that a roaming mode should be entered, and in response, enter the roaming mode, and exchange wireless communications with the second wireless communication network while operating in the roaming mode; and a wireless access point configured to transmit a portion of the communication performance of the first wireless communication network for delivery to the wireless communication device while the wireless communication device is operating in the non-roaming mode.

20. The wireless communication system of claim 19 wherein the portion of the communication performance of the first wireless communication network comprises information related to failed incoming voice calls or failed incoming data message transmissions.

* * * * *